United States Patent
Chen et al.

(10) Patent No.: US 12,067,779 B1
(45) Date of Patent: Aug. 20, 2024

(54) CONTRASTIVE LEARNING OF SCENE REPRESENTATION GUIDED BY VIDEO SIMILARITIES

(71) Applicant: Amazon Technologies, Inc., Seattle, WA (US)

(72) Inventors: Shixing Chen, Kirkland, WA (US); Xiang Hao, Kenmore, WA (US); Xiaohan Nie, Lynnwood, WA (US); Muhammad Raffay Hamid, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 368 days.

(21) Appl. No.: 17/668,014

(22) Filed: Feb. 9, 2022

(51) Int. Cl.
  *G06V 20/40* (2022.01)
  *G06V 10/774* (2022.01)

(52) U.S. Cl.
  CPC ............ *G06V 20/48* (2022.01); *G06V 10/774* (2022.01); *G06V 20/46* (2022.01)

(58) Field of Classification Search
  CPC ....... G06V 20/48; G06V 20/46; G06V 10/774
  See application file for complete search history.

(56) References Cited

U.S. PATENT DOCUMENTS

| | | | | |
|---|---|---|---|---|
| 7,051,352 | B1 * | 5/2006 | Schaffer .................. | H04N 7/163 706/45 |
| 10,467,526 | B1 * | 11/2019 | Appalaraju .......... | G06V 10/774 |
| 11,350,169 | B2 * | 5/2022 | Liu ........................ | G06V 20/48 |
| 11,354,905 | B1 * | 6/2022 | Chen ...................... | G06V 20/49 |
| 11,748,988 | B1 * | 9/2023 | Chen ...................... | G06F 16/78 386/241 |
| 2004/0001081 | A1 * | 1/2004 | Marsh ................... | G06F 16/735 715/721 |

(Continued)

FOREIGN PATENT DOCUMENTS

KR  102221792 B1 * 3/2021

OTHER PUBLICATIONS

W. Hu, N. Xie, L. Li, X. Zeng and S. Maybank, "A Survey on Visual Content-Based Video Indexing and Retrieval," in IEEE Transactions on Systems, Man, and Cybernetics, Part C (Applications and Reviews), vol. 41, No. 6, pp. 797-819, Nov. 2011, doi: 10.1109/TSMCC.2011.2109710. (Year: 2011).*

(Continued)

*Primary Examiner* — Michael Robert Cammarata
(74) *Attorney, Agent, or Firm* — BakerHostetler

(57) ABSTRACT

A plurality of similar video pairs may be determined based on one or more similarity information types. Each video pair of the plurality of similar video pairs may include a first respective video and a second respective video. For each video pair, one or more similar scene pairs may be determined. Each of the one or more similar scene pairs may include a respective first scene from the first respective video and a second respective scene from the second respective video. An encoder may be trained using a contrastive learning model that contrasts a plurality of similar scene pairs with a plurality of random scenes. The plurality of similar scene pairs may include the one or more scene pairs for each video pair. One or more scene features of one or more other scenes of one or more other videos may be determined using the encoder.

20 Claims, 8 Drawing Sheets

(56) References Cited

U.S. PATENT DOCUMENTS

| | | | | |
|---|---|---|---|---|
| 2009/0083790 | A1* | 3/2009 | Wang | G11B 27/28 |
| | | | | 725/38 |
| 2012/0291057 | A1* | 11/2012 | Gunda | H04H 60/45 |
| | | | | 725/14 |
| 2019/0384987 | A1* | 12/2019 | Li | G06F 16/71 |
| 2020/0193164 | A1* | 6/2020 | Katti | G06V 10/82 |
| 2021/0144442 | A1* | 5/2021 | Liu | G06N 3/045 |
| 2022/0309278 | A1* | 9/2022 | Gan | G06N 3/04 |
| 2023/0086023 | A1* | 3/2023 | Lai | G06V 10/82 |
| | | | | 382/156 |
| 2023/0306056 | A1* | 9/2023 | Lee | G06F 16/783 |
| 2024/0087293 | A1* | 3/2024 | Redford | G06N 3/08 |

OTHER PUBLICATIONS

Chao-Yuan Wu, Christoph Feichtenhofer, Haoqi Fan, Kaiming He, Philipp Krahenbuhl, and Ross Girshick. Long-term feature banks for detailed video understanding. In CVPR, 2019. (Year: 2019).*

M. R. Naphade and T. S. Huang, "Extracting semantics from audio-visual content: the final frontier in multimedia retrieval, " in IEEE Transactions on Neural Networks, vol. 13, No. 4, pp. 793-810, Jul. 2002, doi: 10.1109/TNN.2002.1021881. (Year: 2002).*

Conceiç ao, Felipe LA, et al. "Multimodal data fusion framework based on autoencoders for top-N recommender systems." Applied Intelligence 49 (2019): 3267-3282. (Year: 2019).*

Deldjoo, Yashar, et al. "Using visual features based on MPEG-7 and deep learning for movie recommendation." International journal of multimedia information retrieval 7 (2018): 207-219. (Year: 2018).*

S. Chen, X. Nie, D. Fan, D. Zhang, V. Bhat and R. Hamid, "Shot Contrastive Self-Supervised Learning for Scene Boundary Detection," 2021 IEEE/CVF Conference on Computer Vision and Pattern Recognition (CVPR), Nashville, TN, USA, Jun. 20-25, 2021, pp. 9791-9800, doi: 10.1109/CVPR46437.2021.00967. (Year: 2021).*

Shao, Jie, et al. "Temporal context aggregation for video retrieval with contrastive learning." Proceedings of the IEEE/CVF winter conference on applications of computer vision. 2021. (Year: 2021).*

Angles et al.; "MIST: Multiple Instance Spatial Transformer"; IEEE/CVF Conf. on Computer Vision and Pattern Recognition; 2021; p. 2412-2422.

Carbonneau et al.; "Multiple instance learning: A survey of problem characteristics and applications"; Pattern Recognition; vol. 77; May 2018; p. 329-353.

Carreira et al.; "A Short Note about Kinetics-600"; Computer Vision and Pattern Recognition; arXiv:1808.01340; 2018; 6 pages.

Carreira et al.; "Quo Vadis, Action Recognition? A New Model and the Kinetics Dataset"; IEEE Conf. on Computer Vision and Pattern Recognition; 2017; p. 6299-6308.

Chen et al.; "Shot Contrastive Self-Supervised Learning for Scene Boundary Detection"; IEEE/CVF Conf. on Computer Vision and Pattern Recognition; 2021; p. 9796-9805.

Chen et al.; "A Simple Framework for Contrastive Learning of Visual Representations"; 37th Int'l Conf. on Machine Learning; vol. 119; 2020; p. 1597-1607.

Devlin et al.; "BERT: Pre-training of Deep Bidirectional Transformers for Language Understanding"; Computation and Language; arXiv:1810.04805; 2019; 16 pages.

Dosovitskiy et al.; "An Image is Worth 16x16 Words: Transformers for Image Recognition at Scale"; Computer Vision and Pattern Recognition; arXiv.2010.11929; 2021; 22 pages.

Dwibedi et al.; "With a Little Help from My Friends: Nearest-Neighbor Contrastive Learning of Visual Representations"; IEEE/CVF Int'l Conf. on Computer Vision; 2021; p. 9588-9597.

Fan et al.; "Multiscale Vision Transformers"; IEEE/CVF Int'l Conf. on Computer Vision; 2021; 18 pages.

Feichtenhofer et al.; "SlowFast Networks for Video Recognition"; IEEE/CVF Int'l Conf. on Computer Vision; 2019; p. 6202-6211.

Feng et al.; "MIST: Multiple Instance Self-Training Framework for Video Anomaly Detection"; IEEE/CVF Conf. on Computer Vision and Pattern Recognition; 2021; p. 14009-14018.

Grill et al.; "Bootstrap your own latent: A new approach to self-supervised Learning"; Machine Learning; arXiv:2006.07733; 2020; 35 pages.

Gu et al.; "AVA: A Video Dataset of Spatio-Temporally Localized Atomic Visual Actions"; IEEE Conf. on Computer Vision and Pattern Recognition; 2018; p. 6047-6056.

He et al.; "Momentum Contrast for Unsupervised Visual Representation Learning"; IEEE/CVF Conf. on Computer Vision and Pattern Recognition; 2020; p. 9729-9738.

Henaff et al.; "Data-Efficient Image Recognition with Contrastive Predictive Coding"; $37^{th}$ Int'l Conf. on Machine Learning; vol. 119; 2020; p. 4182-4192.

Huang et al.; "MovieNet: A Holistic Dataset for Movie Understanding; European Conf. on Computer Vision; 2020; 58 pages.

What is the 'More Like This' section?, https://help.imdb.com/article/imdb/discover-watch/what-is-the-more-like-this-section/GPE7SPGZREKKY7YN?ref_=cons_tt_rec_Im#, web-archive capture from Feb. 3, 2022, accessed on Feb. 14, 2023 from https://web.archive.org/web/20220203163248/https://help.imdb.com/article/imdb/discover-watch/what-is-the-more-like-this-section/GPE7SPGZREKKY7YN?ref_=cons_tt_rec_Im#; 2 pages.

Jaiswal et al.; "A Survey on Contrastive Self-Supervised Learning"; Technologies; vol. 9; 2021; 22 pages.

Jiang et al.; http://crcv.ucf.edu/THUMOS14/; Int'l Workshop and Competition on Action Recognition with a Large Numbers of Classes; 2014; accessed Jan. 27, 2022; 2 pages.

Jing et al.; "Self-Supervised Visual Feature Learning With Deep Neural Networks: A Survey"; IEEE Transactions on Pattern Analysis and Machine Intelligence; vol. 43; 2021; 24 pages.

Kay et al.; "The Kinetics Human Action Video Dataset"; Computer Vision and Pattern Recognition; arXiv:1705.06950; 2017; 22 pages.

Kingma et al.; "Adam: A Method for Stochastic Optimization"; Machine Learning; arXiv:1412.6980; 2014; 15 pages.

Le-Khac et al.; "Contrastive Representation Learning: A Framework and Review"; IEEE Access; vol. 8; 2020; p. 193907-193934.

Li et al.; "The AVA-Kinetics Localized Human Actions Video Dataset"; Computer Vision and Pattern Recognition; arXiv:2005.00214; 2020; 8 pages.

Li et al.; "Dual-Stream Multiple Instance Learning Network for Whole Slide Image Classification With Self-Supervised Contrastive Learning"; IEEE/CVF Conf. on Computer Vision and Pattern Recognition; 2021; p. 14318-14328.

Liu et al.; "Multi-Shot Temporal Event Localization: A Benchmark"; IEEE/CVF Conf. on Computer Vision and Pattern Recognition; 2021; p. 12596-12606.

Liu et al.; "RoBERTa: A Robustly Optimized BERT Pretraining Approach"; Computer Language; arXiv: 1907.11692; 2019; 13 pages.

Oord et al.; "Representation Learning with Contrastive Predictive Coding"; Machine Learning; arXiv:1807.03748; 2018; 13 pages.

Radford et al.; "Learning Transferable Visual Models From Natural Language Supervision"; Computer Vision and Pattern Recognition; arXiv:2103.00020; 2021; 48 pages.

Rao et al.; "A Local-to-Global Approach to Multi-Modal Movie Scene Segmentation"; IEEE/CVF Conf. on Computer Vision and Pattern Recognition; 2020; p. 10146-10155.

Sidiropoulos et al.; "Temporal Video Segmentation to Scenes Using High-Level Audiovisual Features"; IEEE Transactions on Circuits and Systems for Video Technology; vol. 21; Aug. 2011; p. 1163-1177.

Sun et al.; "VideoBERT: A Joint Model for Video and Language Representation Learning"; IEEE/CVF Int'l Conf. on Computer Vision; 2019; p. 7464-7473.

Tian et al.; "What Makes for Good Views for Contrastive Learning?"; $34^{th}$ Conf. on Neural Information Processing Systems; 2020; 24 pages.

Touvron et al.; "Training data-efficient image transformers & distillation through attention"; $38^{th}$ Int'l Conf. on Machine Learning; vol. 139; 2021; p. 10347-10357.

Vaswani et al.; "Attention is all you need"; Conf. on Neural Information Processing Systems; 2017; 15 pages.

(56) References Cited

OTHER PUBLICATIONS

Wang et al.; "Temporal Segment Networks: Towards Good Practices for Deep Action Recognition"; European Conf. on Computer Vision; 2016; p. 20-36.

Wang et al.; "Generalizing from a Few Examples: A Survey on Few-shot Learning"; ACM Computing Surveys; vol. 53; 2021; 34 pages.

Wolf et al.; "Transformers: State-of-the-Art Natural Language Processing"; Proceedings of the Conf. on Empirical Methods in Natural Language Processing: Systems Demonstrations; 2020; p. 38-45.

Wu et al.; "Towards Long-Form Video Understanding"; IEEE/CVF Conf. on Computer Vision and Pattern Recognition; 2021; p. 1884-1894.

Wu et al.; "Unsupervised Feature Learning via Non-Parametric Instance Discrimination"; IEEE Conf. on Computer Vision and Pattern Recognition; 2018; p. 3733-3742.

Xu et al.; "G-TAD: Sub-Graph Localization for Temporal Action Detection"; IEEE/CVF Conf. on Computer Vision and Pattern Recognition; 2020; p. 10156-10165.

Zeng et al.; "Graph Convolutional Networks for Temporal Action Localization"; IEEE/CVF Int'l Conf. on Computer Vision; 2019; p. 7094-7103.

Zolfaghari et al.; "CrossCLR: Cross-Modal Contrastive Learning for Multi-Modal Video Representations"; IEEE/CVF Int'l Conf. on Computer Vision; 2021; p. 1450-1459.

Arnab et al.; "Vivit: A Video Vision Transformer"; Computer Vision and Pattern Recognition; arXiv:2103.15691; 2021; 14 pages.

Bertasius et al.; "Is Space-Time Attention All You Need for Video Understanding?"; Computer Vision and Pattern Recognition; arXiv:2102.05095; 2021; 13 pages.

Birhane et al.; "Multimodal datasets: misogyny, pornography, and malignant stereotypes"; Computers and Society; arXiv:2110.01963; 2021; 33 pages.

Deng et al.; "ImageNet: A large-scale hierarchical image database"; IEEE Conf. on Computer Vision and Pattern Recognition; 2009; 8 pages.

Feichtenhofer; "X3D: Expanding Architectures for Efficient Video Recognition"; IEEE/CVF Conf. on Computer Vision and Pattern Recognition; 2020; p. 203-213.

Goyal et al.; "Accurate, Large Minibatch SGD: Training ImageNet in 1 Hour"; Computer Vision and Pattern Recognition; arXiv:1706.02677; 2017; 12 pages.

Han et al.; "Memory-Augmented Dense Predictive Coding for Video Representation Learning"; European Conf. on Computer Vision; 2020; p. 312-329.

He et al.; "Deep Residual Learning for Image Recognition"; IEEE Conf. on Computer Vision and Pattern Recognition; 2016; p. 770-778.

Schuhmann et al.; "LAION-400M: Open Dataset of CLIP-Filtered 400 Million Image-Text Pairs"; Computer Vision and Pattern Recognition; arXiv.2111.02114; 2021; 5 pages.

Zhou et al.; Places: A 10 Million Image Database for Scene Recognition; IEEE Transactions on Pattern Analysis and Machine Intelligence; vol. 40; Jun. 2018; p. 1452-1464.

Wang et al.; "Understanding the Behaviour of Contrastive Loss"; IEEE/CVF Conference on Computer Vision and Pattern Recognition; 2021; 2495-2504.

* cited by examiner

CONTRASTIVE LEARNING OF SCENE REPRESENTATION GUIDED BY VIDEO SIMILARITIES

BACKGROUND

Long form video refers to video content that has a content arc with a beginning, middle and end and that is typically longer than ten minutes. Some common examples of long form videos may include movies and television shows. Automated understanding and representation of video scenes, particularly in a long form video, is a challenging problem. There are a variety of applications for which video understanding and representation may be employed. These applications may include video moderation, video search and video recommendation. For example, scene understanding may be employed to determine scenes in a video that include violence or other objectionable content. However, the long-form nature of movies, television shows and other videos may cause labeling of their scenes to be a laborious and expensive process.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
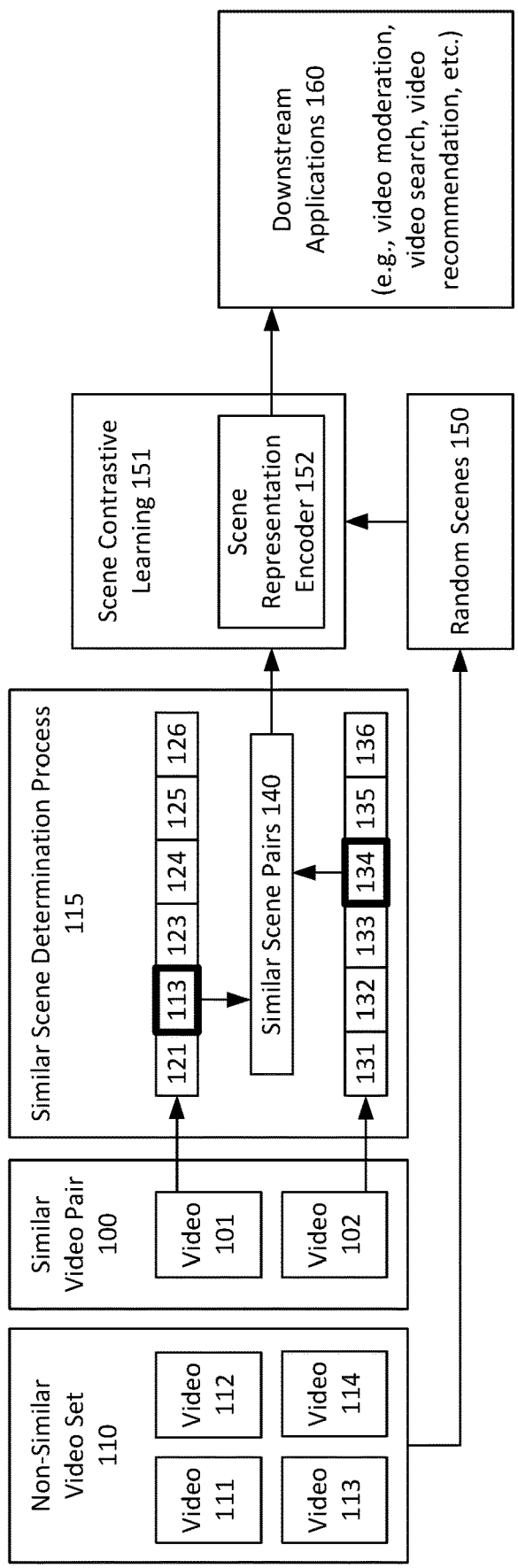
FIG. 1 is a diagram illustrating an example scene representation contrastive learning system that may be used in accordance with the present disclosure.

Techniques for contrastive learning of scene representation guided by video similarities are described herein. According to the techniques described herein, pairs of similar videos (e.g., movies, television shows, etc.) may be determined based on one or more similarity information types. Each pair of similar video pairs may include two videos whose contents are similar to one another. The similarity information types may include information, such as video genre information, video synopsis information, and video recommendation information. For example, information regarding video genres and video synopses may be available from sources such as video streaming sites, video review and rating sites, programming guides, and the like. Additionally, in some examples, these and other sources may provide recommendation information, such as based on one or more previously searched and/or viewed videos. For example, if a user searches for information about a first video and/or watches the first video, the recommendation information may recommend one or more other similar videos that the user may also wish to watch.

For each pair of similar videos, one or more similar scene pairs may be determined. Each of the one or more similar scene pairs may include a respective first scene from a first video in the video pair and a respective second scene from a second video in the video pair. In some examples, the similar scene pairs may be determined by first determining features of each shot from the first video in the video pair and each shot from the second video in the video pair. In some cases, the shot features may be determined using a combination of a fixed encoder and a learnable encoder. A shot-adjacency matrix may then be constructed that indicates first amounts of shot-level similarity between each shot of the first video and each shot of the second video. The shot-adjacency matrix may then be used to construct a scene-adjacency matrix. The scene-adjacency matrix may indicate second amounts of scene-level similarity between each scene of the first video and each scene of the second video.

The similar scene pairs from each of the similar video pairs may then be provided as part of training data that is used to train a scene representation encoder. In one specific example, the top half (e.g., the top fifty percent) of similar scene pairs from each of the similar video pairs may be used to train the scene representation encoder. The scene representation encoder may be trained using contrastive learning techniques in which features of the similar scene pairs from the similar video pairs are contrasted with features of random scenes from non-similar videos. Upon being trained, the scene representation encoder may be employed to determine one or more scene features of one or more other scenes of one or more other videos. For example, the one or more features of the one or more other scenes may be inputs to one or more downstream applications, such as a video moderation application, a video search application, and/or a video recommendation application.

The techniques described herein may provide a number of advantages in comparison to some other feature determination techniques. For example, the techniques described herein employ video-level similarity information (e.g., video genre information, video synopsis information, video recommendation information) to define a measure of movie-similarity, and the similarity measure may be used during contrastive learning to limit the search for similar scene pairs to only the videos that are considered similar to each other. This allows the described techniques to find similar scene-pairs that are not only visually similar but are also semantically relevant. This additional semantic relevance can therefore provide a richer set of geometric and thematic data augmentations as compared to some other video classification techniques. Furthermore, unlike some other techniques that mostly focus on images or shots, the techniques described herein may allow use of variable-length multi-shot inputs. This enables the described techniques to seamlessly incorporate the interplay among multiple shots resulting in a more effective and general-purpose scene representation.

FIG. 1 is a diagram illustrating an example scene representation contrastive learning system that may be used in accordance with the present disclosure. As shown in FIG. 1, a similar video pair 100 includes video 101 and video 102. Video 101 and video 102 are determined to have contents that are similar to one another using techniques described in detail below. Additionally, a non-similar video set 110 includes videos 111-114. Videos 111-114 are determined not to have contents that are similar to one another. Videos 101-102 and 111-114 each include a plurality of scenes. In some examples, videos 101-102 and 111-114 (as well as any of the other videos mentioned herein) may include long form videos, such as movies and/or television shows. A shot, as that term is used herein, refers to a series of frames that are captured from the same camera over a consecutive period of time. As described below, a quantity of shots that are included in a scene may be a configurable quantity. Thus, a scene, as that term is used herein, refers to a series of a configurable (e.g., user-selectable) quantity of consecutive shots.

In the example of FIG. 1, a similar scene determination process 115, which is described in detail below, is performed to determine similar scene pairs 140 from video 101 and video 102. As shown, video 101 includes scenes 121-126, while video 102 includes scenes 131-136. In the example of FIG. 1, scene 113 from video 101 is determined to be similar to scene 134 from video 102. The similarity between scene 113 and scene 134 is indicated by the thick black outlining surrounding scene 113 and scene 134 in FIG. 1. It is noted that, in addition to scene 113 and scene 134, any number of other similar scenes from video 101 and video 102 may be included in similar scene pairs 140. Furthermore, in addition to video 101 and video 102, similar scene pairs 140 may also include any number of other similar scenes from any number of other pairs of similar videos (not shown in FIG. 1).

The similar scene pairs 140 are provided as part of training data that is used to train a scene representation encoder 152. In one specific example, the top half (e.g., the top fifty percent) of pairs of similar scenes from each of the similar video pairs may be used to train the scene representation encoder 152. The scene representation encoder 152 may be trained using scene contrastive learning 151, in which features of the similar scene pairs 140 are contrasted with features of random scenes 150 from videos 111-114 in non-similar video set 110. Upon being trained, the scene representation encoder 152 may be employed to perform a variety of downstream applications 160, such as a video moderation application, a video search application, and/or a video recommendation application.

Figure 2:
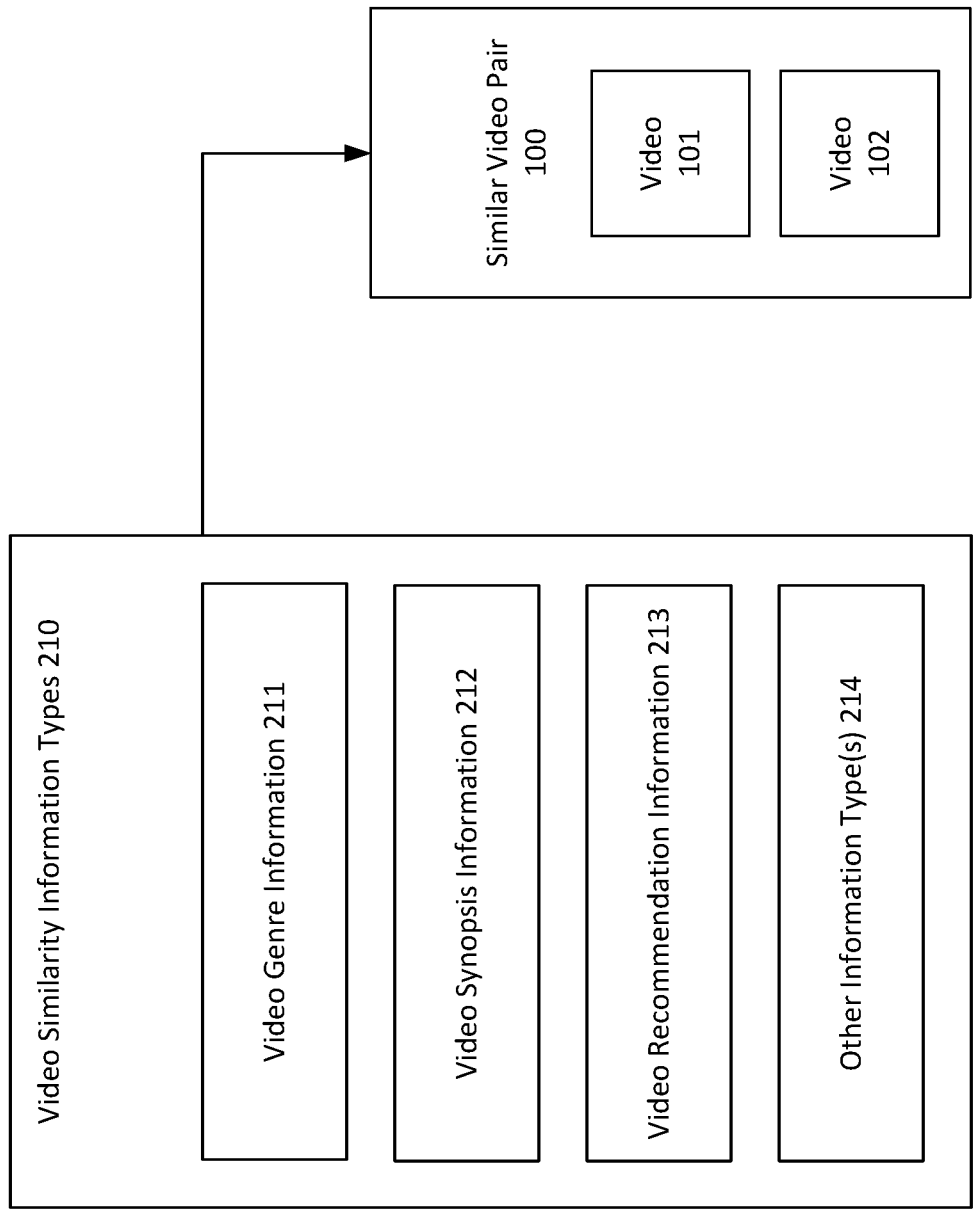
FIG. 2 is a diagram illustrating example video similarity information types that may be used in accordance with the present disclosure.

Referring now to FIG. 2, some examples of video similarity information types 210 will now be described in detail. In particular, in some examples, pairs of similar videos, such as similar video pair 100, may be determined based on one or more of video similarity information types 210. Specifically, in this example, video similarity information types 210 include video genre information 211, video synopsis information 212, video recommendation information 213 and other information type(s) 214. Video genre information 211, video synopsis information 212, and video recommendation information 213 may often be available from sources such as video streaming sites, video review and rating sites, programming guides, and the like. Video genre information 211 may indicate a genre of a video. Some example video genres may include action, drama, animation, kids, foreign, horror, comedy, romance, documentary, science fiction, and others. Video synopsis information 212 may include synopses of corresponding videos. In one specific example, textual embeddings of a video synopsis may be extracted, such as by using a pre-trained model. Pairwise video similarities may then be computed as the inner product of their textual embeddings, and the pairs with the closest similarities may then be selected. Video recommendation information 213 may include information about additional videos that a user may wish to view: Video recommendation information 213 may be determined based on one or more previously searched and/or viewed videos. For example, if a viewer searches for information about a first video and/or watches a first video, the video recommendation information 213 may include a recommendation of one or more other similar videos that the user may also wish to view. In some examples, the video recommendation information 213 may recommend additional similar videos based on factors such as genres, actors, directors, country-of-origin, and the like.

Figure 3:
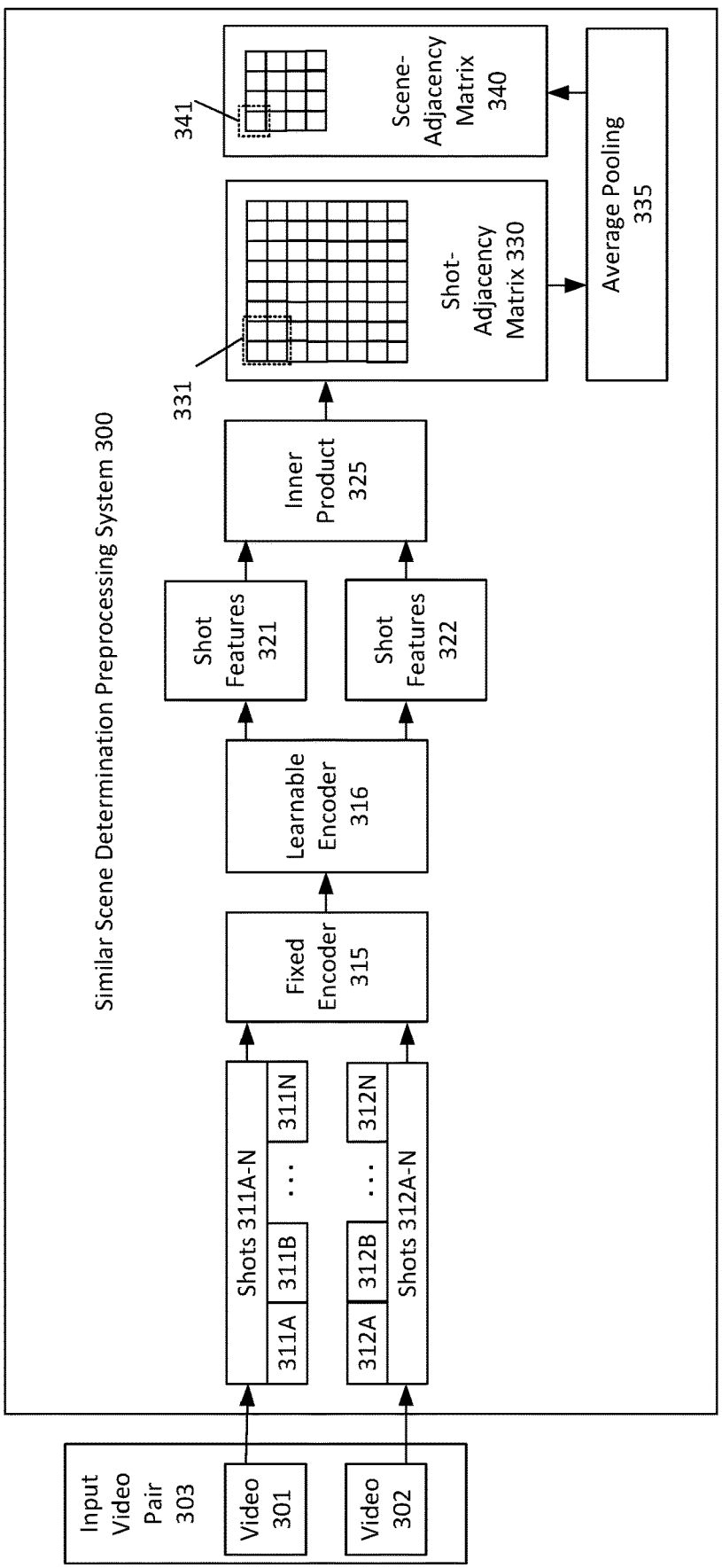
FIG. 3 is a diagram illustrating an example similar scene determination preprocessing system that may be used in accordance with the present disclosure.

Referring now to FIG. 3 an example of a similar scene determination preprocessing system 300 will now be described in detail. As set forth above, one aspect of the techniques described herein is that similar scenes from similar videos may be used to train a scene representation encoder 152 during scene contrastive learning 151. The similar scene determination preprocessing system 300 of FIG. 3 may therefore be used to determine these similar scenes. The use of similar scene determination preprocessing system 300 to perform similar scene determination (e.g., as part of similar scene determination process 115 of FIG. 1) is described in detail below with reference to FIG. 3 and FIG. 5. As shown in FIG. 3, the similar scene determination preprocessing system 300 includes both a fixed encoder 315 (a pre-trained shot feature extraction encoder) and a learnable encoder 316 (an encoder with learned parameters), which may both be employed, in combination, by the similar scene determination preprocessing system 300 to perform similar scene determination process 115. The parameters of the fixed encoder 315 remain fixed during training of the learnable encoder 316. In some examples, before the similar scene determination preprocessing system 300 is used to perform similar scene determination (as shown in FIG. 3 and FIG. 5), the similar scene determination preprocessing system 300 may be used to train the learnable encoder 316 (as shown in FIG. 3 and FIG. 4).

Figure 4:
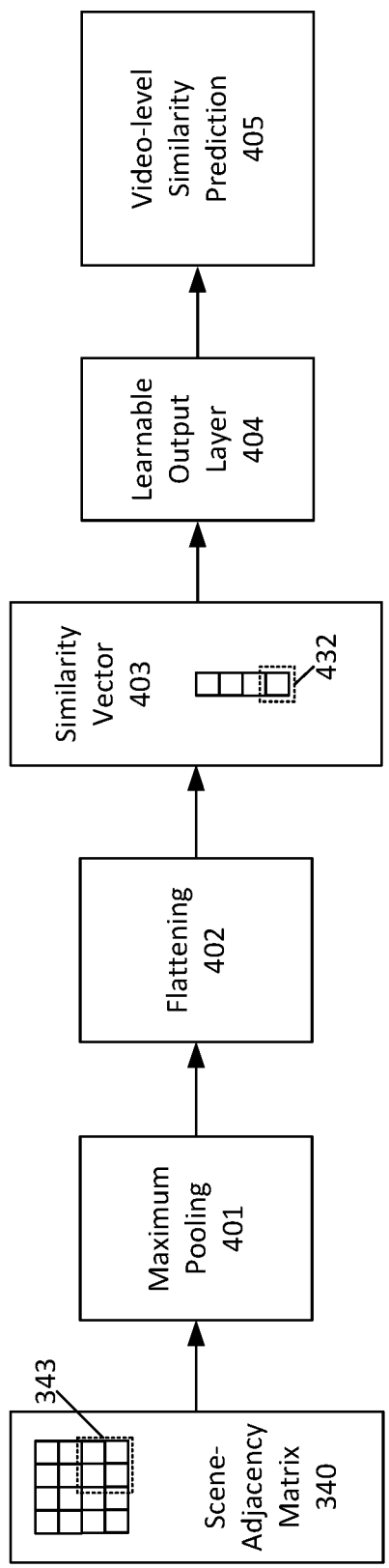
FIG. 4 is a diagram illustrating an example video similarity learning system that may be used in accordance with the present disclosure.
Figure 5:
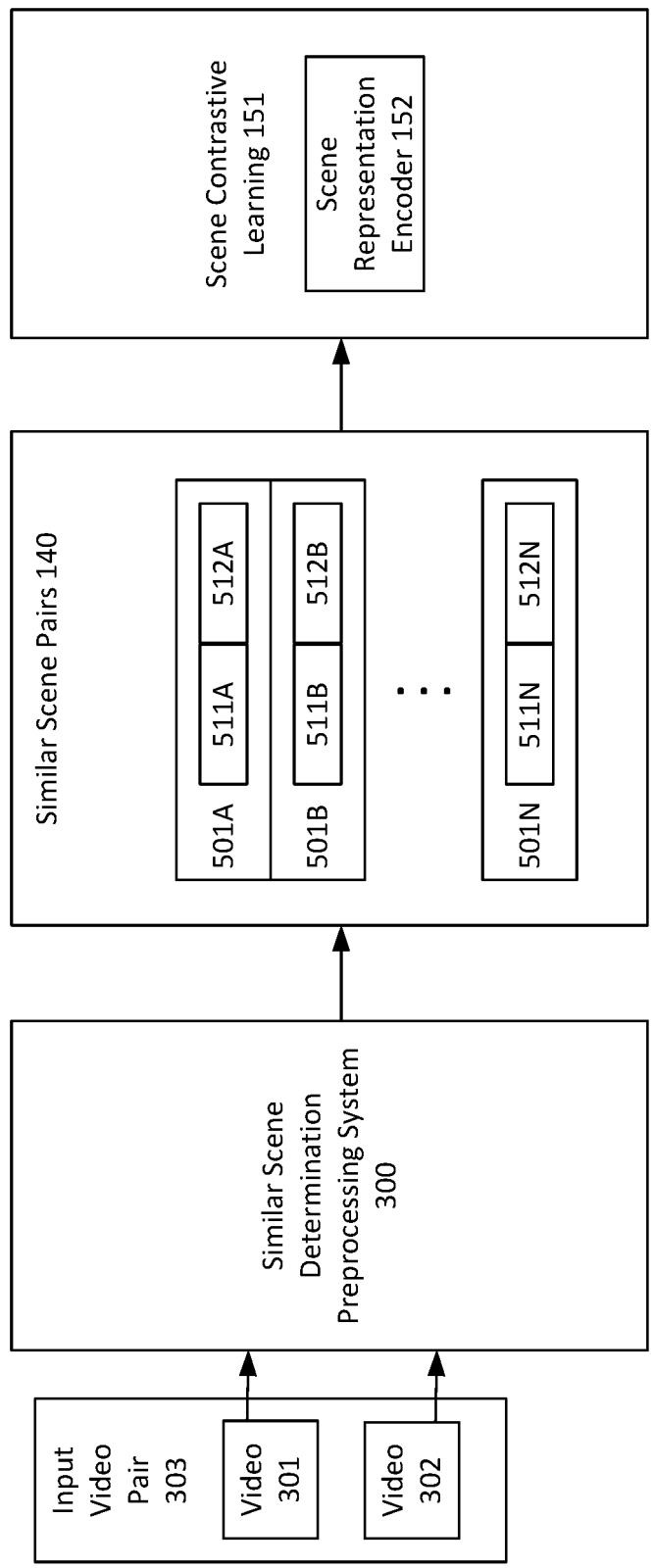
FIG. 5 is a diagram illustrating example similar scene determination system that may be used in accordance with the present disclosure.

The use of similar scene determination preprocessing system 300 to train the learnable encoder 316 (as shown in FIG. 3 and FIG. 4) will now be described in detail. As shown in FIG. 3, an input video pair 303 includes video 301 and video 302. For training purposes, video 301 and video 302 may be either similar videos or non-similar videos. At the initiation of similar scene determination preprocessing system 300, video 301 and video 302 may be divided into their constituent shots. Specifically, video 301 is divided into shots 311A-N (represented by notation $X_1$), and video 302 is divided into shots 312A-N (represented by notation $X_2$). The features of shots 311A-N and 312A-N may then be determined using the fixed encoder 315 and the learnable encoder 316 to generate shot features 321 (corresponding to shots 311A-N from video 301) and shot features 322 (corresponding to shots 312A-N from video 302). Specifically, the features of shots 311A-N and 312A-N may be extracted using fixed encoder 315 so that $X_1$ and $X_2$ are represented by two feature matrices $E_{fixed}(X_1)$ and $E_{fixed}(X_2)$, respectively. These feature matrices are then passed through learnable encoder 316, followed by their inner-product 325 to create a shot-adjacency matrix 330 (represented by notation $A_{x1:x2}$). In this manner, the shot-adjacency matrix 330 may be represented using the following formula:

$$A_{x1:x2} = E_{learnable}(E_{fixed}(X_1)) * E_{learnable}(E_{fixed}(X_2))$$

It is noted that entries in shot-adjacency matrix 330 (represented by notation $A_{x1:x2}$) represent pair-wise similarities between shots in video 301 and video 302.

A value $K_a$ may then be selected that represents a quantity of consecutive shots that are to be defined as scenes. In one specific example, a scene may be defined as sixteen consecutive shots, and the value of sixteen may therefore be assigned to $K_a$. It is noted, however, that users employing the described techniques may optionally select different values (other than sixteen) for $K_a$ to define the quantity of consecutive shots in a scene. The value $K_a$ may then be used convert the shot-adjacency matrix 330 into a scene-adjacency matrix 340. Specifically, a plurality of windows may be formed in the shot-adjacency matrix 330. Each window may have a length of $K_a$ matrix entries and a width of $K_a$ matrix entries, which therefore results in a window size of $K_a*K_a$ matrix entries. Window 331 is an example of a single $K_a*K_a$ window in the shot-adjacency matrix 330. Average pooling 335 may then be applied with kernel size ($K_a$) and stride ($S_a$) on shot-adjacency matrix 330 to calculate the average values in each $K_a*K_a$ window in the shot-adjacency matrix 330. In particular, this causes each matrix entry in the scene-adjacency matrix 340 to correspond to a respective $K_a*K_a$ window in the shot-adjacency matrix 330. For example, matrix entry 341 in the scene-adjacency matrix 340 corresponds to its respective $K_a*K_a$ window in the shot-adjacency matrix 330, which is window 331. The scene-adjacency matrix 340 therefore includes average pooled similarity values for the constituent shots that constitute each scene.

Referring now to FIG. 4, the scene-adjacency matrix 340 may then be used to train the learnable encoder 316. In particular, a value $K_m$ may be selected that is used to form a group of scenes. The value $K_m$ may then be used convert the scene-adjacency matrix 340 into a similarity vector 403. Specifically, a plurality of windows may be formed in the scene-adjacency matrix 340. Each window may have a length of $K_m$ matrix entries and a width of $K_m$ matrix entries, which therefore results in a window size of $K_m*K_m$ matrix entries. Window 343 is an example of a single $K_m*K_m$ window in the scene-adjacency matrix 340. Maximum pooling 401 may then be applied with kernel size ($K_m$) and stride (Sm) on scene-adjacency matrix 340, followed by flattening 402, to calculate the similarity vector 403. In particular, this causes each vector entry in the similarity vector 403 to correspond to a respective $K_m*K_m$ window in the scene-adjacency matrix 340. For example, vector entry 432 in the similarity vector 403 corresponds to its respective $K_m*K_m$ window in the scene-adjacency matrix 340, which is window 343. The similarity vector 403 therefore includes maximum pooled and flattened similarity values for the constituent scenes that correspond to each vector entry.

Finally, a projection between similarity vector 403 and a video-level similarity prediction 405 is learned using a learnable output layer 404 where the goal is to predict whether shots 311A-N (from video 301) and shots 312A-N (from video 302) are similar at the video-level. In some examples, the video-level similarity prediction 405 may have a binary value (e.g., a value of zero or one). For example, if shots 311A-N and shots 312A-N are shots from similar movies, then the target value for the video-level similarity prediction 405 may be one. By contrast, if shots 311A-N and shots 312A-N are shots from non-similar movies, then the target value for the video-level similarity prediction 405 may be zero. As described above, for training purposes, video 301 and video 302 may be either similar videos or non-similar videos. Therefore, when video 301 and video 302 are similar videos, the target value for the video-level similarity prediction 405 may be one. By contrast, when video 301 and video 302 are non-similar videos, the target value for the video-level similarity prediction 405 may be zero. In some other examples, the video-level similarity prediction 405 may include non-binary values. During training, cross-entropy loss may be employed to update the learnable encoder 316 and the learnable output layer 404 while the fixed encoder 315 remains unchanged.

Thus, as described above with reference to FIGS. 3 and 4, a training process may be employed to train the learnable encoder 316 while the fixed encoder 315 remains unchanged. Once the learnable encoder 316 has been trained, the similar scene determination preprocessing system 300 may be re-used (with the learnable encoder 316 being already trained) to determine similar scenes pairs from similar videos (e.g., as part of similar scene determination process 115 of FIG. 1). Referring now to FIG. 5, some example similar scene pair determination techniques will now be described in detail. As shown, input video pair 303, which includes video 301 and video 302, is again provided to similar scene determination preprocessing system 300. It is noted, however, that, for purposes of similar scene determination, only similar video pairs may be used. Thus, for purposes of similar scene determination, video 301 and video 302 will be similar to one another, for example as determined based on video similarity information types 210 of FIG. 2. The similar scene determination preprocessing system 300 may then preprocess video 301 and video 302 in order to generate scene-adjacency matrix 340 for video 301 and video 302. It is noted that the similar scene determination preprocessing system 300 is described in detail above with respect to FIG. 3. While similar scene determination preprocessing system 300 is described above in the context of training of the learnable encoder 316, the similar scene determination preprocessing system 300 may be employed in a similar manner in order to perform similar scene determination in the context of FIG. 5. Thus, the above description of similar scene determination preprocessing system 300 is not repeated here.

Upon generation of the scene-adjacency matrix 340 (via similar scene determination preprocessing system 300), the scene-adjacency matrix 340 may be employed to determine similar scene pairs 140 from video 301 and video 302. As described above, the similar scene pairs 140 may include scene pairs that will be used as part of scene contrastive learning 151 to train scene representation encoder 152. The similar scene pairs 140 may include one or more of the most similar scene pairs from video 301 and video 302. In one specific example, the top half (e.g., the top fifty percent) most similar scene pairs from video 301 and video 302 (as well as other similar movie pairs) may be used as part of scene contrastive learning 151 to train scene representation encoder 152 (and therefore may be included in similar scene pairs 140). In the example of FIG. 5, similar scene pairs 140 include scene pairs 501A-N. Each of scene pairs 501A-N may include a respective first scene from video 301 (e.g., each of scenes 511A-N from video 301). Additionally, each of scene pairs 501A-N may include a respective second scene from video 302 (e.g., each of scenes 512A-N from video 302). In some examples, the values in scene-adjacency matrix 340 may have a range of values in which the highest values represent the most similar scene pairs and lowest values represent the least similar scene pairs. Additionally, in some examples, the scene pairs corresponding to the highest fifty percent of all values in the scene-adjacency matrix 340 (representing the top fifty percent of similar scene pairs) may be used as part of scene contrastive learning 151 to train scene representation encoder 152 (and therefore may be included in similar scene pairs 140). It is noted that any number of additional pairs of similar videos (not shown in FIG. 5) may also be provided to similar scene determination preprocessing system 300 in order to select the most similar scenes from those video pairs for inclusion in similar scene pairs 140 for use in scene contrastive learning 151.

Upon determination of similar scene pairs 140 for video 301 and video 302 (and additional pairs of similar videos), scene contrastive learning 151 may then be performed in order to train scene representation encoder 152. As described above, during scene contrastive learning 151, features of the similar scene pairs 140 are contrasted with features of random scenes 150 from non-similar videos (e.g., videos 111-114 of FIG. 1). As the inputs to the scene representation encoder 152 for scene contrastive learning 151 are multi-shot sequences, the scene representation encoder 152 may be designed so that it may effectively model the various relationships among input shots. To this end, the scene representation encoder 152 may be a transformer-based encoder that treats patches in input shots as tokens. Specifically, a shot that is provided as input to the scene representation encoder 152 may have corresponding dimensions (k, w, h, c), in which (k) is the number of frames in the shot, (w) is the width of each frame, (h) is the height of each frame, and (c) is the color channel of each frame (e.g., a Red Green Blue (RGB) color channel). The shot may be divided into a sequence of (k, w/p, h/p, c) patches, in which (p, p) is the size of each patch. To input the shot to a transformer with a latent vector size of D dimensions, D*c convolutional kernels may be applied with kernel size (p, p) and stride (p, p) to the (k, w/p, h/p, c) patches. This converts the shot into patch embeddings with dimension (k, D, w/p, h/p), which may be further flattened to a (k, D, N) dimensional tensor where N=(w*h)/p². Furthermore, a trained embedding may be prepended to the patch embeddings in a manner similar to a class token. After permutation, the result is (N+1, D) dimensional patch embeddings for each of the (k) frames. Next, (N+1, D) dimensional positional embeddings may be added to patch embeddings to retain positional information and passed to successive multi-headed self-attention (MSA) layers.

Similarly, for an input corresponding to a scene with (n) shots, the scene may be divided into a sequence of (n, k, w/p, h/p, c) patches. After convolution and flattening, (D, N, n, k) dimensional patch embeddings may be obtained. It is noted that this is different from the dimension of a frame, and it does not match with the dimension of position embeddings. The N-dimensional position embeddings may be interpolated to N· n· k, excluding the 1-dimension corresponding to class token, and the interpolated position embeddings may be added to patch embeddings before providing them to MSA layers. These operations may offer a number of advantages. For example, the proposed techniques for applying two-dimensional interpolation to position embeddings allows scaling them from single frames to shots and scenes, and this enables powerful models pre-trained on large image datasets to be readily adopted for long-form video understanding without explicit temporal modeling. Additionally, using two-dimensional interpolation to the position embeddings of the scene representation encoder 152 allows it to take variable-length shot-sequences as inputs. This enables the described approach to be applicable to settings in which the lengths of multi-shot sequences in scene contrastive learning 151 are different from those available in downstream applications 160.

In association with scene contrastive learning 151, a scene-level pretext task may be defined that may use commonly available video-level information, making it highly effective for long-form video understanding. Additionally, the use of a vision transformer-based scene-encoder may allow variable length inputs and the possibility to adopt large-scale pretrained models. Specifically, a pretext task may be defined as a dictionary look-up for the scenes selected at the end of the video similarity learning. That is, given a query scene (q), its positive key scene ($k_0$) is determined in similar scene pairs 140, and the objective is to find $k_0$ among a set of random scenes $\{k_1; k_2; \ldots k_k\}$. The problem may then be converted to a K+1-way classification task by calculating similarity with dot product. In particular, the contrastive loss ($L_q$) may be computed as follows:

$$L_q = -\log \frac{\exp(f(q \mid \theta_q) \cdot g(k_0 \mid \theta_k)/\tau)}{\sum_{i=0}^{K} \exp(f(q \mid \theta_q) g(k_i \mid \theta_k)/\tau)}$$

In the above equation, $f(\cdot \mid \Theta_q)$ is the query encoder with parameters $\Theta_q$ updated during back-propagation, and $g(\cdot \mid \Theta_k)$ is the key encoder with parameters $\Theta_k$ learned by momentum update. Specifically, in the setting of contrastive learning, there may be two scene encoders, including a query encoder and a key encoder. These two encoders may share a same, or similar, architecture but may function differently. For the query encoder, it may be used to extract features for query scenes (e.g., scenes 511A-N in FIG. 5). The query encoder may have numeric parameters that function in different layers within the encoder, and the parameters (weights) may be updated in a supervised setting. The key encoder may be viewed as an auxiliary encoder. Unlike the query encoder, the key encoder may not be kept after training is done. The key encoder is also a scene encoder and may be used to extract features for key scenes (e.g., scenes 512A-N in FIG. 5). The key encoder also has parameters. One difference between the query encoder and the key encoder is that weights in the key encoder may not be updated by supervised learning. Instead, they may be updated as a moving average of the query encoder, which is referred to as momentum update. The benefits of doing so may include keeping training stable as well as enabling a larger sized memory bank for better performance.

During scene contrastive learning 151, the scene representation encoder 152 may be analogous to the query encoder without the last fully connected layer of the query encoder layers and may be updated based on the similar scene pairs 140. After training converges, the scene representation encoder 152 may be based on the outcome from this stage, which may then be used for downstream applications 160. Specifically, depending on the downstream applications 160, the video-data may be processed to a sequence of shots or frames. Then, features for each sample may be extracted by the scene representation encoder 152, and these features may then be used as input for downstream classifiers.

Figure 6:
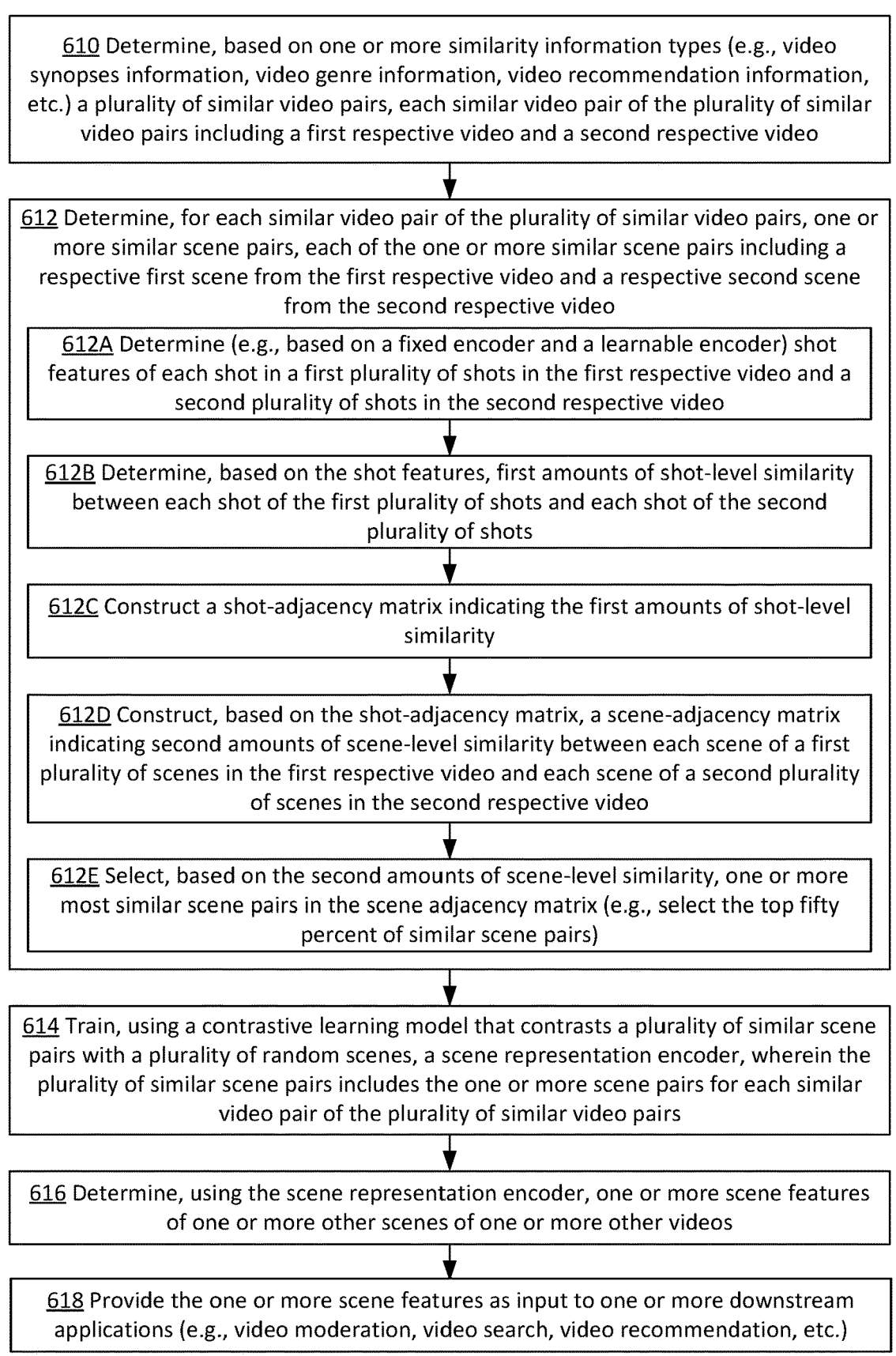
FIG. 6 is a flowchart illustrating an example scene representation contrastive learning process that may be used in accordance with the present disclosure.

FIG. 6 is a flowchart illustrating an example scene representation contrastive learning process that may be used in accordance with the present disclosure. As described above, the techniques described herein may be employed for videos such as movies and television shows. Thus, it is noted that any reference to a video in FIG. 6 and its corresponding description may optionally be considered to apply to a specific type of video such as a movie or a television show. The process of FIG. 6 is initiated at operation 610, at which a plurality of similar video pairs may be determined based on one or more similarity information types, each similar video pair of the plurality of similar video pairs including a first respective video and a second respective video. Specifically, the first respective video and the second respective video may be similar to one another based on the one or more similarity information types. In some examples, each similar video pair of the plurality of similar video pairs may be a pair of movies or a pair of television shows. For example, as shown in FIG. 2, video 101 and video 102 may be determined to be similar to one another based on video similarity information types 210. As described above, video similarity information types 210 may include video genre information 211, video synopsis information 212, video recommendation information 213, and/or other information type(s) 214. Video genre information 211, video synopsis information 212, and video recommendation information 213 may often be available from sources such as video streaming sites, video review and rating sites, programming guides, and the like. Video genre information 211 may indicate a genre of a video. Some example video genres may include action, drama, animation, kids, foreign, horror, comedy, romance, documentary, science fiction, and others. Video synopsis information 212 may include synopses of corresponding videos. In one specific example, textual embeddings of a video synopsis may be extracted, such as by using a pre-trained model. Pairwise video similarities may then be computed as the inner product of their textual embeddings, and the pairs with the closest similarities may then be selected. Video recommendation information 213 may include information about additional videos that a user may wish to view. Video recommendation information 213 may be determined based on one or more previously searched and/or viewed videos. For example, if a viewer searches for information about a first video and/or watches a first video, the video recommendation information 213 may include a recommendation of one or more other similar videos that the user may also wish to view. In some examples, the video recommendation information 213 may recommend additional similar videos based on factors such as genres, actors, directors, country-of-origin, and the like.

At operation 612, for each similar video pair of the plurality of similar video pairs, one or more similar scene pairs are determined, each of the one or more similar scene pairs including a respective first scene from the first respective video and a respective second scene from the second respective video. Some examples of the similar scene determination process are described above with reference to FIG. 3 and FIG. 5. For example, FIG. 3 shows a diagram of similar scene determination preprocessing system 300, and FIG. 5 shows how the similar scene determination preprocessing system 300 may be used to perform similar scene determination. Operation 612 may include sub-operations 612A-E, which will now be described in detail. In particular, at sub-operation 612A, shot features of each shot in a first plurality of shots in the first respective video and a second plurality of shots in the second respective video may be determined. In some examples, the shot features may be determined based at least in part on a fixed encoder and a learnable encoder, wherein parameters of the fixed encoder remain fixed during training of the learnable encoder. For example, as described above with reference to FIG. 3, at the initiation of similar scene determination preprocessing system 300, video 301 (e.g., the first respective video) and video 302 (e.g., the first respective video) may be divided into their constituent shots. Specifically, video 301 is divided into shots 311A-N (represented by notation $X_1$), and video 302 is divided into shots 312A-N (represented by notation $X_2$). The features of shots 311A-N and 312A-N may then be determined using the fixed encoder 315 and the learnable encoder 316 to generate shot features 321 (corresponding to shots 311A-N from video 301) and shot features 322 (corresponding to shots 312A-N from video 302).

At sub-operation 612B, first amounts of shot-level similarity are determined between each shot of the first plurality of shots in the first respective video and each shot of the second plurality of shots in the second respective video. The first amounts of shot-level similarity are determined based on the shot features of each shot of the first plurality of shots and each shot of the second plurality of shots (e.g., as determined at sub-operation 612A). For example, for each pair of shots, a respective first amount of shot-level similarity may be determined by evaluating features of a respective first shot from the first respective video, evaluating features of a respective second shot from the second respective video, and determining an amount of correlation between the features of the first respective shot and the second respective shot. At sub-operation 612C, a shot-adjacency matrix is constructed indicating first amounts of shot-level similarity between each shot of the first plurality of shots in the first respective video and each shot of the second plurality of shots in the second respective video. For example, as described above with reference to FIG. 3, the features of shots 311A-N and 312A-N may be extracted using fixed encoder 315 so that $X_1$ and $X_2$ are represented by two feature matrices $E_{fixed}(X_1)$ and $E_{fixed}(X_2)$, respectively. These feature matrices are then passed through learnable encoder 316, followed by their inner-product 325 to create a shot-adjacency matrix 330.

At sub-operation 612D, a scene-adjacency matrix is constructed based on the shot-adjacency matrix. The scene-adjacency matrix indicates second amounts of scene-level similarity between each scene of a first plurality of scenes in the first respective video and each scene of a second plurality of scenes in the second respective video. For example, as described above with reference to FIG. 3, a value $K_a$ may be selected that represents a quantity of consecutive shots that are to be defined as scenes. In one specific example, a scene may be defined as sixteen consecutive shots, and the value of sixteen may therefore be assigned to $K_a$. It is noted, however, that users employing the described techniques may optionally select different values (other than sixteen) for $K_a$ to define the quantity of consecutive shots in a scene. The value $K_a$ may then be used convert the shot-adjacency matrix 330 into a scene-adjacency matrix 340. Specifically, a plurality of windows may be formed in the shot-adjacency matrix 330. Each window may have a length of $K_a$ matrix entries and a width of $K_a$ matrix entries, which therefore results in a window size of $K_a*K_a$ matrix entries. Window 331 is an example of a single $K_a*K_a$ window in the shot-adjacency matrix 330. Average pooling 335 may then be applied with kernel size ($K_a$) and stride ($S_a$) on shot-adjacency matrix 330 to calculate the average values in each $K_a*K_a$ window in the shot-adjacency matrix 330. In particular, this causes each matrix entry in the scene-adjacency matrix 340 to correspond to a respective $K_a*K_a$ window in the shot-adjacency matrix 330. For example, matrix entry 341 in the scene-adjacency matrix 340 corresponds to its respective $K_a*K_a$ window in the shot-adjacency matrix 330, which is window 331. The scene-adjacency matrix 340 therefore includes average pooled similarity values for the constituent shots that constitute each scene.

At sub-operation 612E, one or more most similar scene pairs (e.g., the top fifty percent of similar scene pairs) in the scene-adjacency matrix are selected based on the second amounts of scene-level similarity. The one or more of the most similar scene pairs in the scene-adjacency matrix may then be used as the one or more similar scene pairs that are determined at operation 612. For example, as described above, the values in scene-adjacency matrix 340 may have a range of values in which the highest values represent the most similar scene pairs and lowest values represent the least similar scene pairs. Additionally, in some examples, the scene pairs corresponding to the highest fifty percent of all values in the scene-adjacency matrix 340 (representing the top fifty percent of similar scene pairs) may be used as part of scene contrastive learning 151 to train scene representation encoder 152 (and therefore may be included in similar scene pairs 140).

At operation 614, a scene representation encoder is trained using a contrastive learning model that contrasts a plurality of similar scene pairs with a plurality of random scenes, wherein the plurality of similar scene pairs includes the one or more scene pairs for each similar video pair of the plurality of similar video pairs. As described above, upon determination of similar scene pairs 140 for video 301 and video 302 (and additional pairs of similar videos), scene contrastive learning 151 may then be performed in order to train scene representation encoder 152. As also described above, during scene contrastive learning 151, features of the similar scene pairs 140 are contrasted with features of random scenes 150 from non-similar videos (e.g., videos 111-114 of FIG. 1). Some example features of the scene representation encoder 152 and the scene contrastive learning 151 are described in detail above, such as with reference to FIG. 5, and the descriptions of these features is not repeated here.

At operation 616, one or more scene features of one or more other scenes of one or more other videos are determined using the scene representation encoder. Some example techniques for training of the scene representation encoder via contrastive learning are described in detail above. Based on this training, the scene representation encoder is able to determine and classify features of video scenes. As described above with reference to FIG. 5, after training converges, the scene representation encoder 152 may be based on the outcome from this stage, which may then be used for downstream applications 160. Specifically, depending on the downstream applications 160, the video-data may be processed to a sequence of shots or frames. Then, features for each sample may be extracted by the scene representation encoder 152, and these features may then be used as input for downstream classifiers. Thus, at operation 618, the one or more scene features determined at operation 616 may be provided as inputs to one or more downstream applications, which may include, for example, a video moderation application, a video search application, and/or a video recommendation application.

Figure 7:
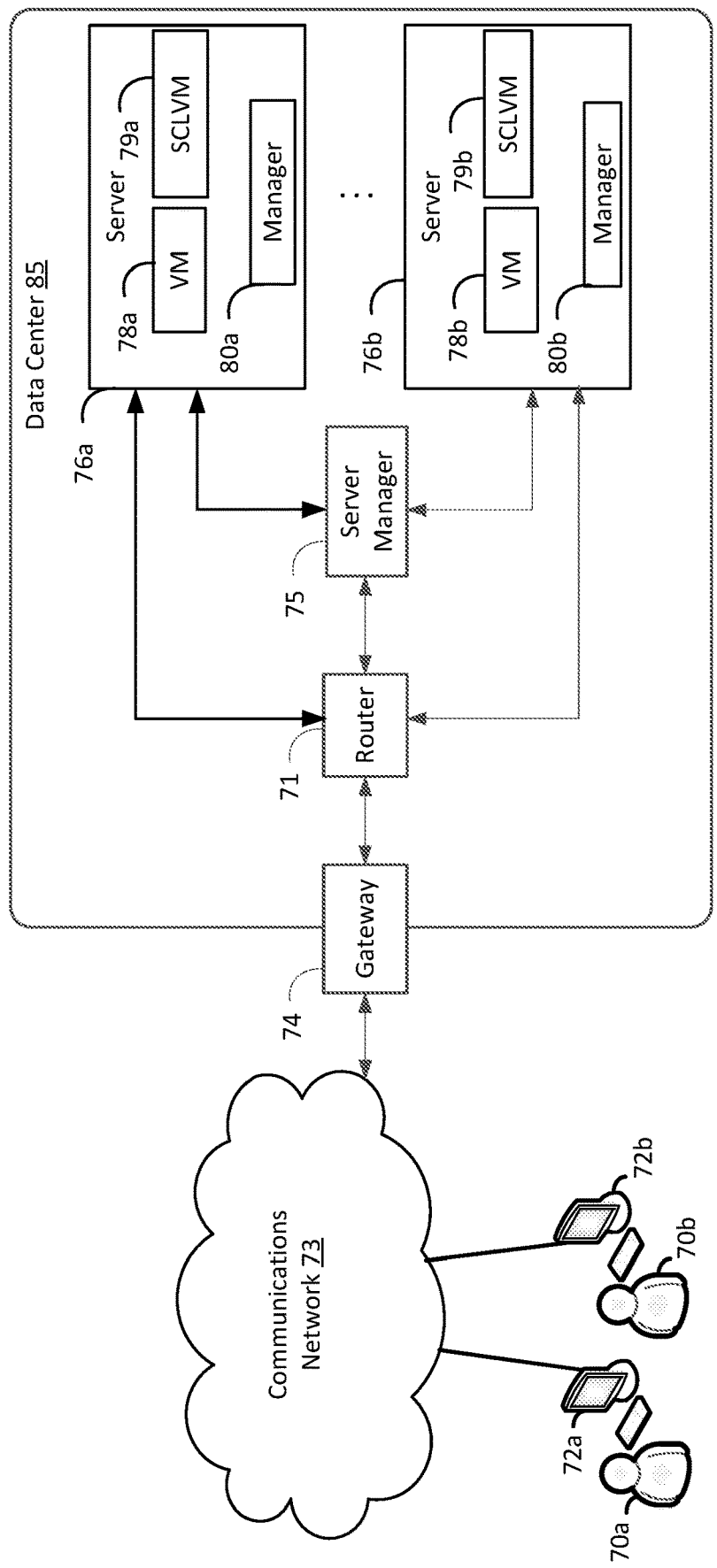
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources-consisting of many processors, large amounts of memory and/or large storage capacity—and small resources-consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include scene contrastive learning virtual machines (SCLVM's) 79a-b, which are virtual machines that are configured to execute any, or all, of the scene contrastive learning techniques described above, such as including, but not limited to, any, or all, of operations 610-618 of FIG. 6.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
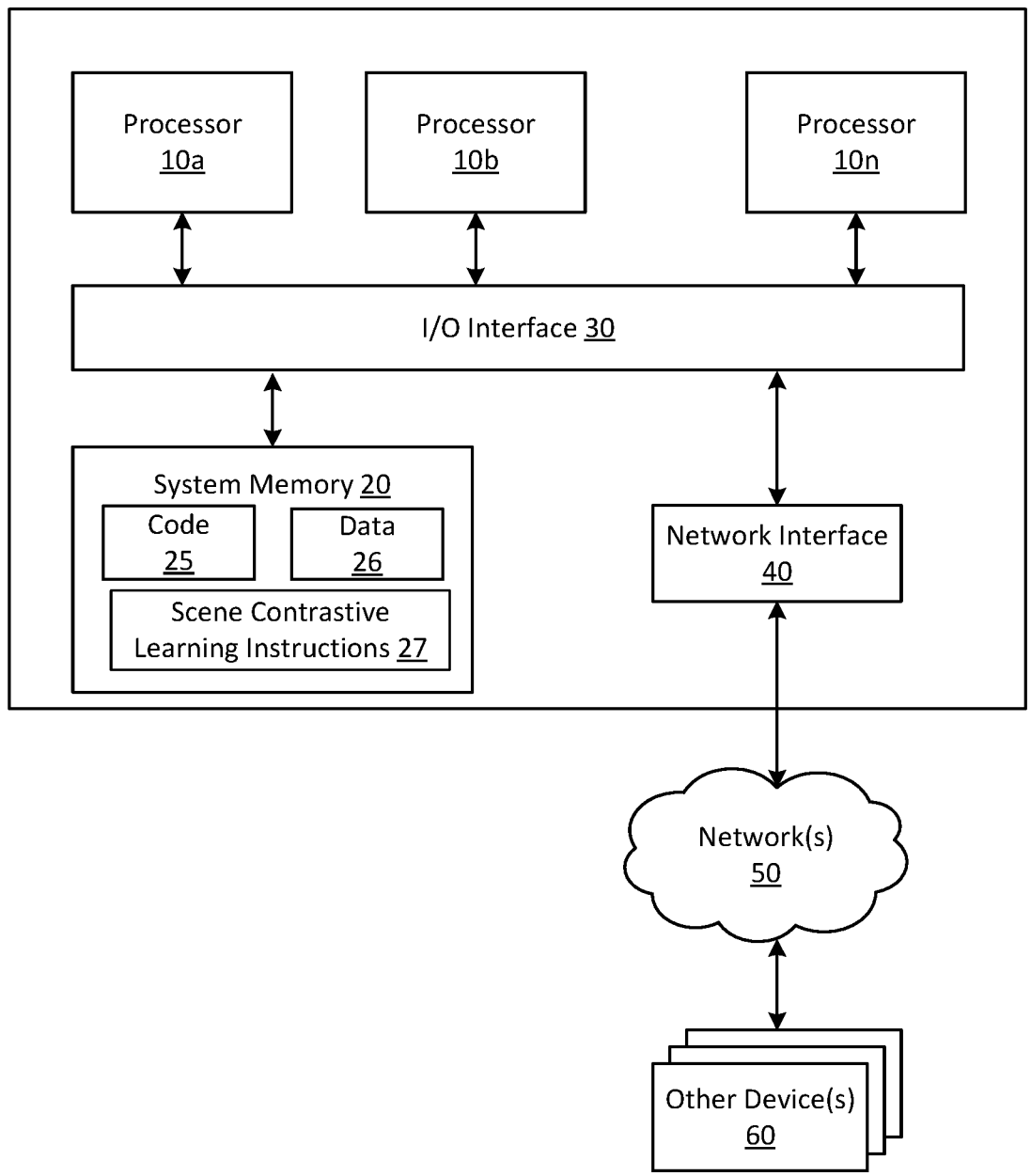
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/FlashR-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes scene contrastive learning instructions 27, which are instructions for executing any, or all, of the scene contrastive learning techniques described above, such as including, but not limited to, any, or all, of operations 610-618 of FIG. 6.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations: in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein instructions that, upon execution by the one or more processors, cause the computing system to perform computing operations comprising:
      determining, based on one or more similarity information types, a plurality of similar movie pairs, each similar movie pair of the plurality of similar movie pairs including a first respective movie and a second respective movie, wherein the first respective movie and the second respective movie are similar to one another based on the one or more similarity information types, and wherein the one or more similarity information types comprise at least one of movie genre information, movie synopsis information, or movie recommendation information;
      determining, for each similar movie pair of the plurality of similar movie pairs, one or more similar scene pairs, each of the one or more similar scene pairs including a respective first scene from the first respective movie and a second respective scene from the second respective movie;
      training, using a contrastive learning model that contrasts a plurality of similar scene pairs with a plurality of random scenes, a scene representation encoder, wherein the plurality of similar scene pairs includes the one or more scene pairs for each similar movie pair of the plurality of similar movie pairs; and
      determining, using the scene representation encoder, one or more scene features of one or more other scenes of one or more other movies.

2. The computing system of claim 1, wherein the determining, for each similar movie pair of the plurality of similar movie pairs, the one or more similar scene pairs comprises:
   constructing a shot-adjacency matrix indicating first amounts of shot-level similarity between each shot of a first plurality of shots in the first respective movie and each shot of a second plurality of shots in the second respective movie.

3. The computing system of claim 2, wherein the determining, for each similar movie pair of the plurality of similar movie pairs, the one or more similar scene pairs further comprises:
   constructing, based on the shot-adjacency matrix, a scene-adjacency matrix indicating second amounts of scene-level similarity between each scene of a first plurality of scenes in the first respective movie and each scene of a second plurality of scenes in the second respective movie.

4. The computing system of claim 3, wherein the determining, for each similar movie pair of the plurality of similar movie pairs, the one or more similar scene pairs further comprises:
   selecting, based on the second amounts of scene-level similarity, one or more most similar scene pairs in the scene-adjacency matrix.

5. A computer-implemented method comprising:
   determining, based on one or more similarity information types, a plurality of similar video pairs, each similar video pair of the plurality of similar video pairs including a first respective video and a second respective video, wherein the first respective video and the second respective video are similar to one another based on the one or more similarity information types;
   determining, for each similar video pair of the plurality of similar video pairs, one or more similar scene pairs, each of the one or more similar scene pairs including a respective first scene from the first respective video and a second respective scene from the second respective video;
   training, using a contrastive learning model that contrasts a plurality of similar scene pairs with a plurality of random scenes, a scene representation encoder, wherein the plurality of similar scene pairs includes the one or more scene pairs for each similar video pair of the plurality of similar video pairs; and
   determining, using the scene representation encoder, one or more scene features of one or more other scenes of one or more other videos.

6. The computer-implemented method of claim 5, wherein the determining, for each similar video pair of the plurality of similar video pairs, the one or more similar scene pairs comprises:
   constructing a shot-adjacency matrix indicating first amounts of shot-level similarity between each shot of a first plurality of shots in the first respective video and each shot of a second plurality of shots in the second respective video.

7. The computer-implemented method of claim 6, wherein the determining, for each similar video pair of the plurality of similar video pairs, the one or more similar scene pairs further comprises:
   constructing, based on the shot-adjacency matrix, a scene-adjacency matrix indicating second amounts of scene-level similarity between each scene of a first plurality of scenes in the first respective video and each scene of a second plurality of scenes in the second respective video.

8. The computer-implemented method of claim 7, wherein the determining, for each similar video pair of the plurality of similar video pairs, the one or more similar scene pairs further comprises:

selecting, based on the second amounts of scene-level similarity, one or more most similar scene pairs in the scene-adjacency matrix.

9. The computer-implemented method of claim 6, further comprising:

determining the first amounts of shot-level similarity based on shot features of each shot of the first plurality of shots and each shot of the second plurality of shots.

10. The computer-implemented method of claim 9, further comprising:

determining the shot features based at least in part on a fixed encoder and a learnable encoder, wherein parameters of the fixed encoder remain fixed during training of the learnable encoder.

11. The computer-implemented method of claim 5, wherein the one or more similarity information types comprise at least one of video genre information, video synopsis information, or video recommendation information.

12. The computer-implemented method of claim 5, wherein the one or more scene features are provided as inputs to at least one of a video moderation application, a video search application, or a video recommendation application.

13. The computer-implemented method of claim 5, wherein each similar video pair of the plurality of similar video pairs is a pair of movies or a pair of television shows.

14. One or more non-transitory computer-readable storage media having stored thereon computing instructions that, upon execution by one or more computing devices, cause the one or more computing devices to perform computing operations comprising:

determining, based on one or more similarity information types, a plurality of similar video pairs, each similar video pair of the plurality of similar video pairs including a first respective video and a second respective video, wherein the first respective video and the second respective video are similar to one another based on the one or more similarity information types;

determining, for each similar video pair of the plurality of similar video pairs, one or more similar scene pairs, each of the one or more similar scene pairs including a respective first scene from the first respective video and a second respective scene from the second respective video;

training, using a contrastive learning model that contrasts a plurality of similar scene pairs with a plurality of random scenes, a scene representation encoder, wherein the plurality of similar scene pairs includes the one or more scene pairs for each similar video pair of the plurality of similar video pairs; and determining, using the scene representation encoder, one or more scene features of one or more other scenes of one or more other videos.

15. The one or more non-transitory computer-readable storage media of claim 14, wherein the determining, for each similar video pair of the plurality of similar video pairs, the one or more similar scene pairs comprises:

constructing a shot-adjacency matrix indicating first amounts of shot-level similarity between each shot of a first plurality of shots in the first respective video and each shot of a second plurality of shots in the second respective video.

16. The one or more non-transitory computer-readable storage media of claim 15, wherein the determining, for each similar video pair of the plurality of similar video pairs, the one or more similar scene pairs further comprises:

constructing, based on the shot-adjacency matrix, a scene-adjacency matrix indicating second amounts of scene-level similarity between each scene of a first plurality of scenes in the first respective video and each scene of a second plurality of scenes in the second respective video.

17. The one or more non-transitory computer-readable storage media of claim 16, wherein the determining, for each similar video pair of the plurality of similar video pairs, the one or more similar scene pairs further comprises:

selecting, based on the second amounts of scene-level similarity, one or more most similar scene pairs in the scene-adjacency matrix.

18. The one or more non-transitory computer-readable storage media of claim 15, wherein the operations further comprise:

determining the first amounts of shot-level similarity based on shot features of each shot of the first plurality of shots and each shot of the second plurality of shots.

19. The one or more non-transitory computer-readable storage media of claim 18, wherein the operations further comprise:

determining the shot features based at least in part on a fixed encoder and a learnable encoder, wherein parameters of the fixed encoder remain fixed during training of the learnable encoder.

20. The one or more non-transitory computer-readable storage media of claim 14, wherein the one or more similarity information types comprise at least one of video genre information, video synopsis information, or video recommendation information.

* * * * *